United States Patent
Tsai et al.

(10) Patent No.: US 8,511,883 B2
(45) Date of Patent: *Aug. 20, 2013

(54) LIGHT GUIDE APPARATUS FOR A BACKLIGHT MODULE

(75) Inventors: Chung-Lin Tsai, Taoyuan (TW); Yu-Jeng Lin, Taoyuan (TW)

(73) Assignee: Global Lighting Technologies Inc., Taoyuan (TW)

( * ) Notice: Subject to any disclaimer, the term of this patent is extended or adjusted under 35 U.S.C. 154(b) by 116 days.

This patent is subject to a terminal disclaimer.

(21) Appl. No.: 13/172,881

(22) Filed: Jun. 30, 2011

(65) Prior Publication Data

US 2012/0170313 A1    Jul. 5, 2012

Related U.S. Application Data

(63) Continuation-in-part of application No. 12/464,104, filed on May 12, 2009, now Pat. No. 7,997,784.

(51) Int. Cl.
*F21V 8/00* (2006.01)

(52) U.S. Cl.
USPC .......................................... 362/621; 362/631

(58) Field of Classification Search
USPC ...................... 362/615, 621, 627, 630, 97.3
See application file for complete search history.

(56) References Cited

U.S. PATENT DOCUMENTS

| | | | |
|---|---|---|---|
| 7,997,784 B2 * | 8/2011 | Tsai | 362/621 |
| 2012/0170317 A1 * | 7/2012 | Tsai et al. | 362/621 |
| 2012/0170318 A1 * | 7/2012 | Tsai et al. | 362/630 |

* cited by examiner

*Primary Examiner* — David V Bruce
(74) *Attorney, Agent, or Firm* — Jianq Chyun IP Office

(57) ABSTRACT

A light guide apparatus for a backlight module is provided. The light guide apparatus comprises a light guide plate and an electrical component. The light guide plate is configured with a circuit thereon. The electrical component is attached to the light guide plate and electrically coupled to the circuit. The light guide apparatus integrates a light guide panel, a circuit and an electrical component together for obtaining simpler structure and lower cost.

12 Claims, 4 Drawing Sheets

LIGHT GUIDE APPARATUS FOR A BACKLIGHT MODULE

CROSS-REFERENCE TO RELATED APPLICATION

This application is a continuation-in-part application of and claims the priority benefit of a prior application Ser. No. 12/464,104, filed on May 12, 2009, now pending. The entirety of the above-mentioned patent application is hereby incorporated by reference herein and made a part of this specification.

BACKGROUND OF THE INVENTION

1. Field of the Invention

The present invention generally relates to a light guide apparatus for a backlight module and fabricating method thereof, in particular, to a light guide apparatus which integrates a light guide panel, a circuit and an electrical component together for obtaining simpler structure and lower cost.

2. Description of Related Art

Backlight modules are now widely used in many kinds of electronic products. For example, displays of notebook computers, mobile phones, and liquid crystal televisions do not emit light by themselves, and require backlight modules for providing light sources.

A typical backlight module includes a light guide plate and a light source. Light emitting diodes (LED) are often employed serving as light sources of backlight modules for those electronic products demanding a relatively thin thickness. With respect to such a backlight module, the LED light source is positioned at a lateral side of the light guide plate. The light guide plate has a first surface and a second surface opposite to the first surface. A reflective sheet is provided at the first surface, and a plurality of optical sheets including a diffusing sheet and a prism sheet are provided at the second surface. An outer frame is provided for framing all of the components. In operation, the LED light source emits a light, and the light is inputted into light guide plate from the lateral side of the light guide plate. A part of the light is reflected by the reflective sheet, and sequentially passes through the diffusing sheet and the prism sheet, and is then outputted therefrom.

When serving for a backlight module having a relatively small area, the light sources are usually provided at one lateral side of the light guide plate. However, when serving for a backlight module having a relatively large area, if the light sources are only provided at one side of the light guide plate, the light inputted into the light guide plate gradually attenuates while being transmitted to the other side of the light guide plate. This often causes a nonuniform illuminating condition of the light guide plate. As such, a large size light guide plate is often provided with light sources at both sides for solving the problem of the single side light sources.

FIG. 1 is a schematic diagram illustrating a conventional backlight module including a light guide plate and light sources assembled together. Referring to FIG. 1, no matter the light sources are provided to one side, two sides, or even more sides of the light guide plate 1, the conventional backlight module is generally configured by providing LEDs 2 onto a circuit board 3, and then assembling the LEDs 2 and the circuit board together to the lateral side(s) of the light guide plate 1. Accordingly, in fabricating such a backlight module, the LEDs 2 must be previously welded to the circuit board 3. Then, the circuit board 3, together with the LEDs 2 welded thereon, is secured to the light guide plate 1. As such, the process of the fabrication is relatively complex, and needs a high fabrication cost.

SUMMARY OF THE INVENTION

Accordingly, the present invention is directed to a light guide apparatus for a backlight module which integrates a light guide plate, a circuit and an electrical component together for obtaining simpler structure and lower cost.

The present invention provides a light guide apparatus for a backlight module. The light guide apparatus comprises a light guide plate and an electrical component. The light guide plate is configured with a circuit thereon. The electrical component is attached to the light guide plate and electrically coupled to the circuit.

According to an embodiment of the present invention, the light guide apparatus further comprises a recessed compartment disposed at the light guide plate such that the electrical component is received therein.

According to an embodiment of the present invention, the electrical component is a light source.

According to an embodiment of the present invention, the light source comprises an LED die and a carrier. The LED die has an anode and a cathode. The carrier is for carrying the LED die.

According to an embodiment of the present invention, the light source further comprises a conductive adhesive disposed between the cathode of the LED die and the carrier.

According to an embodiment of the present invention, the light source further comprises a conductive wire bridging the anode of the LED die and the carrier.

According to an embodiment of the present invention, the electrical component is a light sensor.

According to an embodiment of the present invention, the electrical component includes control circuit.

According to an embodiment of the present invention, the electrical component is a resistor.

According to an embodiment of the present invention, the electrical component is a capacitor.

According to an embodiment of the present invention, the electrical component is disposed on a planar surface of the light guide plate.

According to an embodiment of the present invention, the electrical component is disposed on a side surface of the light guide plate.

In the invention, the light guide apparatus integrates a light guide plate, a circuit and an electrical component together. Especially, the electrical component can be any kind of electrical element, such as light source, light sensor, control circuit, resistor, capacitor, integrated circuit or the like according to the design requirement. Therefore, a design flexibility can be enhanced, and the structure of the light guide apparatus can be simplified.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
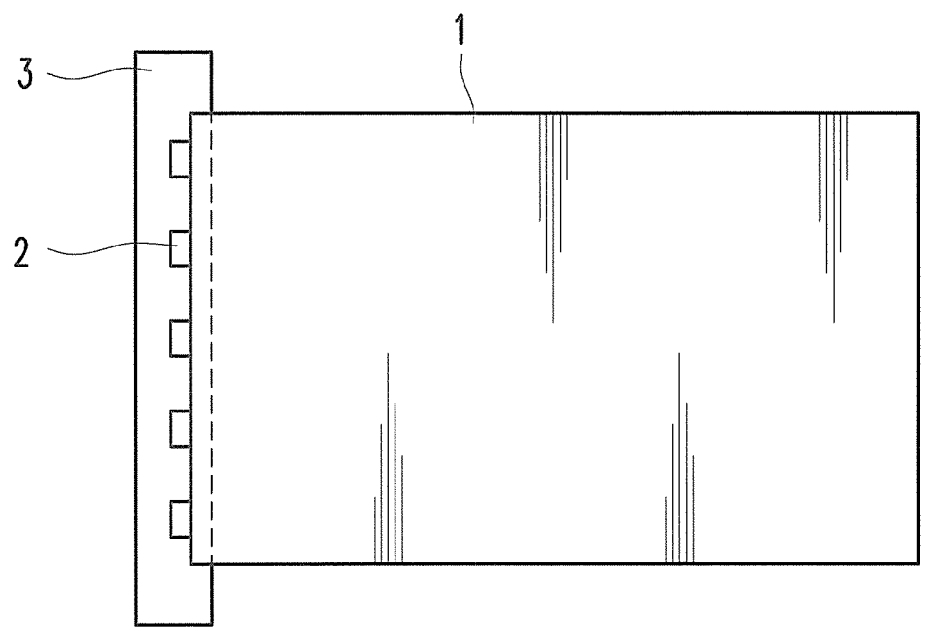
FIG. 1 is a schematic diagram illustrating a conventional backlight module including a light guide plate and light sources assembled together.

Reference will now be made in detail to the present preferred embodiments of the invention, examples of which are illustrated in the accompanying drawings. Wherever possible, the same reference numbers are used in the drawings and the description to refer to the same or like parts.

Figure 2:
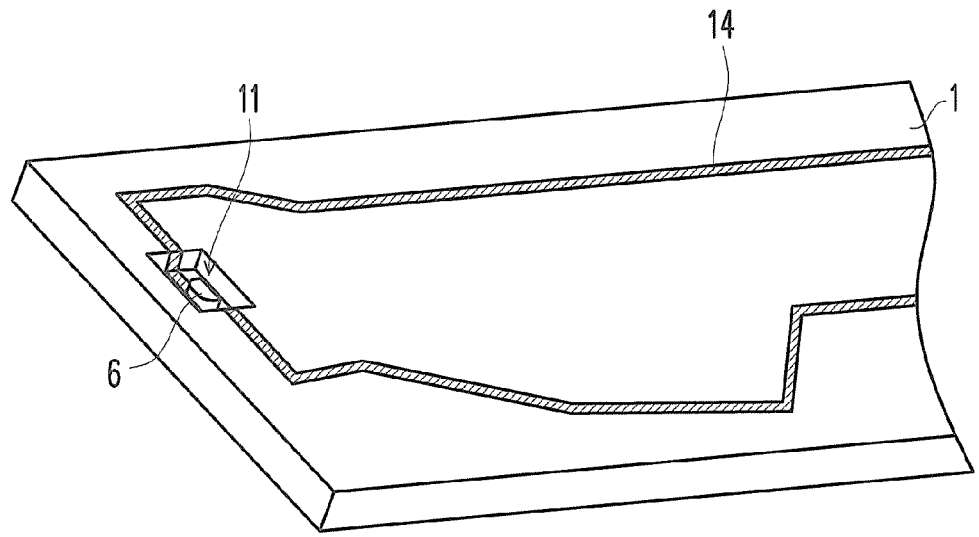
FIG. 2 is a perspective view showing a light guide apparatus, wherein the electrical component is received in a recessed compartment disposed at the light guide plate.

FIG. 2 is a perspective view showing a light guide apparatus, wherein the electrical component is received in a recessed compartment disposed at the light guide plate. Please referring to FIG. 2, The light guide apparatus 10 comprises a light guide plate 1 and an electrical component 6. The light guide plate 1 is configured with a circuit 14 thereon. The electrical component 6 is attached to the light guide plate 1 and electrically coupled to the circuit 14. The circuit 14 can serve as an electrical signal transmission path and formed at the light guide plate 1. In other words, electrical signals from the electrical component 6 can be transmitted in the circuit 14.

Referring to FIG. 2, the light guide apparatus 10 may further comprises a recessed compartment 11 disposed at the light guide plate 1 such that the electrical component 6 is received therein. The upper surface of the electrical component 6 can be lower or equal to the surface of the light guide plate 1. Therefore, the electrical component 6 can be properly contained in the light guide plate 1 with uniform evenness.

Figure 3:
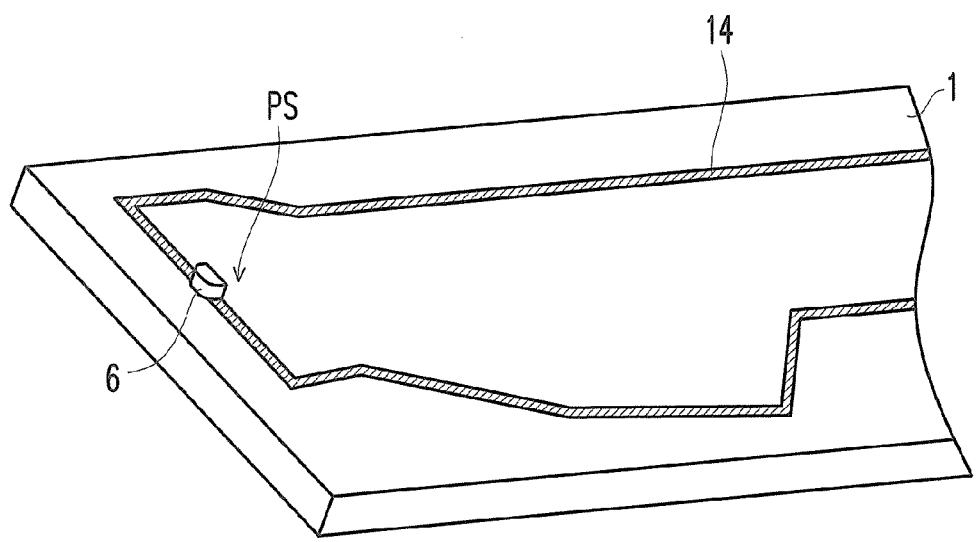
FIG. 3 is a perspective view showing a light guide apparatus according to another embodiment of the present invention, wherein the electrical component is disposed on a planar surface of the light guide plate.

FIG. 3 is a perspective view showing a light guide apparatus according to another embodiment of the present invention, wherein the electrical component is disposed on a planar surface of the light guide plate. The structure details of the light guide apparatus 10A are similar to light guide apparatus 10 described in FIG. 2, thus the same components are denoted with the same notations and the descriptions thereof are omitted. Please referring to the FIG. 3, the electrical component 6 is disposed on a planar surface PS of the light guide plate 1. Therefore, the electrical component 6 can be easily attached to the light guide plate 1 at suitable position.

Figure 4:
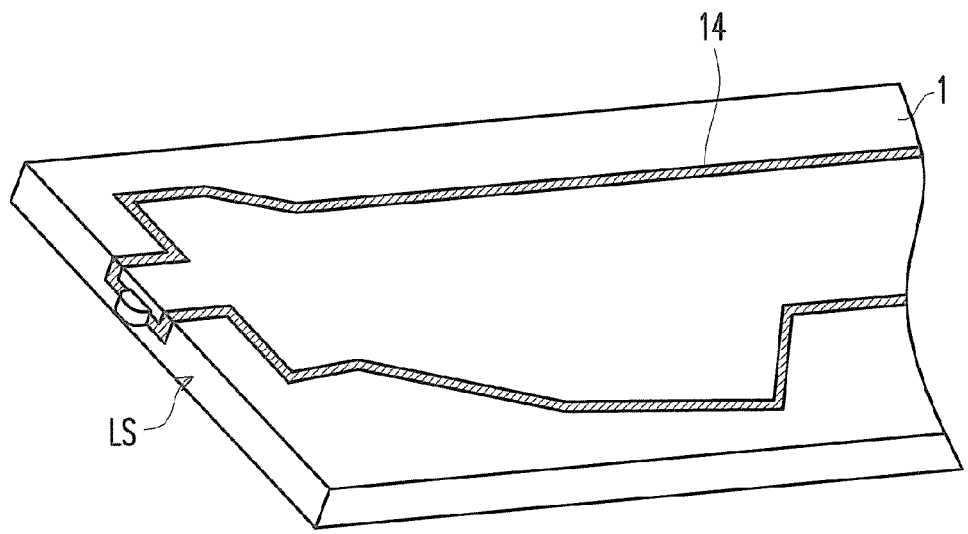
FIG. 4 is a perspective view showing a light guide apparatus according to another embodiment of the present invention, wherein the electrical component is disposed on a side surface of the light guide plate.

FIG. 4 is a perspective view showing a light guide apparatus according to another embodiment of the present invention, wherein the electrical component is disposed on a side surface of the light guide plate. The structure details of the light guide apparatus 10B are similar to light guide apparatus 10 described in FIG. 2, thus the same components are denoted with the same notations and the descriptions thereof are omitted. Please referring to the FIG. 4, the electrical component 6 is disposed on a side surface LS of the light guide plate 1. In the embodiment, when the electrical component 6 is as a light source, the light emitted from the electrical component 6 can incident into the light guide plate 1 smoothly. Moreover, the location of the electrical component 6 disposed at the light guide plate 1 can be properly adjusted and not being limited to embodiments described in the FIGS. 2, 3 and 4.

Referring to FIGS. 2-4 again, the electrical component 6 can be any kind of electrical element, such as light source, light sensor, control circuit, resistor, capacitor, integrated circuit or the like. When the electrical component 6 is a light source, the electrical component 6 can provide light into the light guide plate 1. When the electrical component 6 is a light sensor, the electrical component 6 can detect environmental light for further adjusting the light source (not shown). When the electrical component 6 is a control circuit, the electrical component 6 can be used for controlling an operation of a light source. When the electrical component 6 is a resistor or a capacitance, the electrical component 6 can be used for adjusting an electrical characteristic of a light source. According to the desired design requirement, the kind of electrical component 6 can be chosen properly and be integrated with the light guide plate 1 which a circuit 14 is configured thereon, so as to increase the design flexibility and simplify the structure of the light guide apparatus 10.

Figure 5:
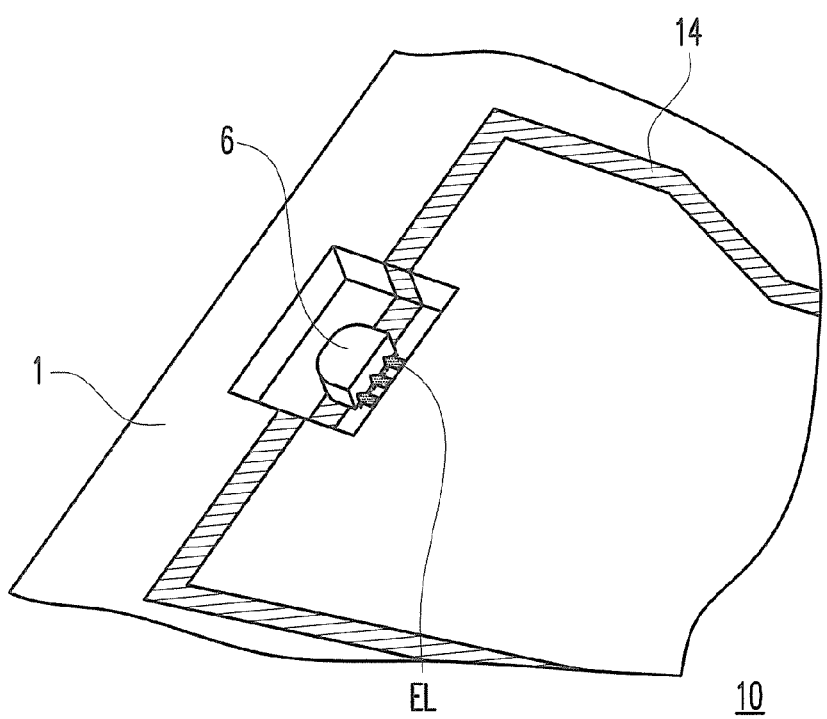
FIG. 5 is a perspective view showing a light guide apparatus according to another embodiment of the present invention, wherein the electrical component is a light sensor.

FIG. 5 is a perspective view showing a light guide apparatus according to another embodiment of the present invention, wherein the electrical component is a light sensor. Please referring to FIG. 5, in this embodiment, the electrical component 6 is a light sensor. In detail, the electrical component 6 (light sensor) can detect environmental light EL and determine light intensity around the light guide apparatus 10. Then, a feedback signal can be provided from the electrical component 6 according to the above detected results, and the feedback signal is for adjusting the light intensity of a light source (not shown) disposed at any position of the light guide plate 1 or at a side of the light guide plate 1.

Figure 6:
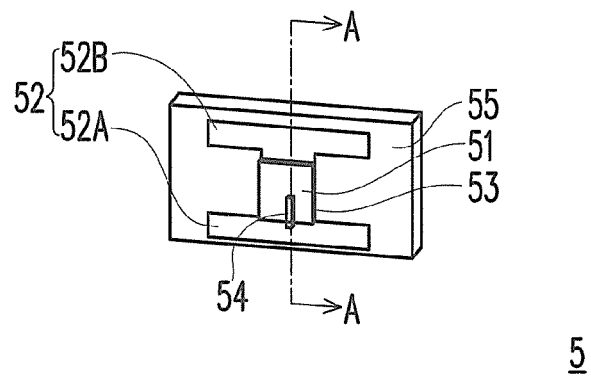
FIG. 6 is a perspective view showing that a structure of electrical component when the electrical component is a light source according to an embodiment of the present invention.
Figure 7:
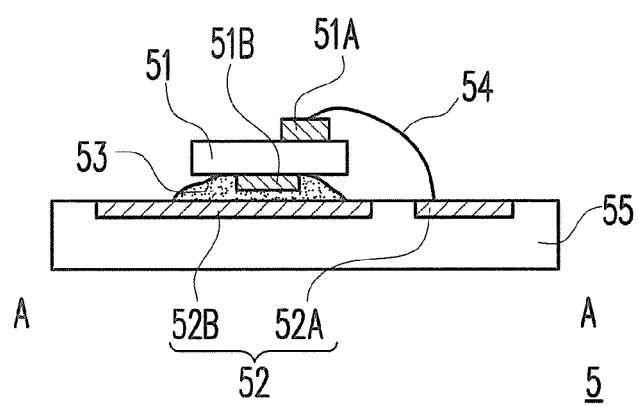
FIG. 7 is a cross-sectional view of the electrical component (light source) along line A-A in the FIG. 6.

FIG. 6 is a perspective view showing that a structure of electrical component when the electrical component is a light source according to an embodiment of the present invention. FIG. 7 is a cross-sectional view of the electrical component (light source) along line A-A in the FIG. 6. Please referring to FIGS. 2, 6 and 7, the electrical component 6 can be a light source 5, and the light source 5 may comprises an LED die 51 having an anode 51A and a cathode 51B; and a carrier 52 for carrying the LED die 51. Moreover, as shown in FIGS. 6 and 7, the light source 5 may further comprises a conductive adhesive 53 disposed between the cathode 51B of the LED die 51 and the carrier 52. The conductive adhesive 53 can be anisotropic conductive paste, silver paste, conductive polymer paste or the like. Besides, the light source 5 may further comprises a conductive wire 54 bridging the anode 51A of the LED die 51 and the carrier 52.

Referring to FIGS. 6 and 7, the carrier 52 may include an anode portion 52A and a cathode portion 52B. The anode portion 52A is electrically connected with the anode 51A of the LED die 51 through the conductive wire 54. And, the cathode portion 52B is electrically connected with the cathode 51B of the LED die 51 through the conductive adhesive 53. Moreover, the light source 5 may include a substrate 55, which the LED die 51 and the carrier 52 are disposed thereon. The substrate 55 can be a transparent substrate utilizing transparent plastic material as same as the light guide panel 1. For example, the light guide plate 1 can be made of a material selected from a group consisting of polymethyl methacrylate (PMMA), polycarbonate (PC), polystyrene (PS), polypropylene (PP) and combination thereof.

In brief, light guide apparatus 10 may comprises a light guide plate 1 and an electrical component 6. The light guide plate 1 is configured with a circuit 14 thereon. The electrical component 6 is attached to the light guide plate 1 and electrically coupled to the circuit 14. Therefore, the light guide apparatus integrates a light guide panel 1, a circuit 14 and an electrical component 6 together for obtaining simpler structure and lower cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light guide apparatus for a backlight module, comprising:
   a light guide plate configured with a circuit thereon; and
   an electrical component attached to the light guide plate and electrically coupled to the circuit.

2. The light guide apparatus as claimed in claim 1, further comprising:
   a recessed compartment disposed at the light guide plate such that the electrical component is received therein.

3. The light guide apparatus as claimed in claim 1, wherein the electrical component is a light source.

4. The light guide apparatus as claimed in claim 3, wherein the light source comprises:
   an LED die having an anode and a cathode; and
   a carrier for carrying the LED die.

5. The light guide apparatus as claimed in claim 4, further comprising:
   a conductive adhesive disposed between the cathode of the LED die and the carrier.

6. The light guide apparatus as claimed in claim 4, further comprising:
   a conductive wire bridging the anode of the LED die and the carrier.

7. The light guide apparatus as claimed in claim 1, wherein the electrical component is a light sensor.

8. The light guide apparatus as claimed in claim 1, wherein the electrical component includes control circuit.

9. The light guide apparatus as claimed in claim 1, wherein the electrical component is a resistor.

10. The light guide apparatus as claimed in claim 1, wherein the electrical component is a capacitor.

11. The light guide apparatus as claimed in claim 1, wherein the electrical component is disposed on a planar surface of the light guide plate.

12. The light guide apparatus as claimed in claim 1, wherein the electrical component is disposed on a side surface of the light guide plate.

* * * * *